July 19, 1960  A. E. MARTIN  2,945,953

GRATING SPECTROMETERS

Filed March 18, 1958

United States Patent Office 2,945,953
Patented July 19, 1960

2,945,953
GRATING SPECTROMETERS

Albert E. Martin, Newcastle-upon-Tyne, England, assignor to Sir Howard Grubb Parsons & Company Limited, Newcastle-upon-Tyne, England Filed Mar. 18, 1958, Ser. No. 722,347

Claims priority, application Great Britain Mar. 19, 1957

7 Claims. (Cl. 250—43.5)

This invention relates to improvements in and relating to grating spectrometers.

When parallel radiation falls on a plane ruled grating at an angle of incidence $i_1$ (Figure 1) rays diffracted at an angle $i_2$ reinforce each other if the following well known equation is satisfied:

$$d \sin i_1 + d \sin i_2 = n\lambda$$

where $d$ is the grating specing, $\lambda$ the wavelength of the particular radiation under consideration and $n$ the order of the spectrum.

This is frequently referred to as the grating equation.

In infra-red monochromators a Littrow arrangement with a plane grating is commonly used and in this case the grating equation becomes $$2d \sin i = n\lambda$$

where $i_1 = i_2 = i$.

To change the wavelength it is only necessary to vary $i$ by rotating the grating. There is, however, the difficulty that $$\lambda, \frac{\lambda}{2}, \frac{\lambda}{3}$$

etc. equally satisfy the grating equation, so that all of these wavelengths simultaneously pass through the exit slit of the monochromator and some means must be employed to isolate the particular order required. Usually a prism unit is used for this purpose, but this adds appreciably to the complication and cost of the complete equipment, since means must be provided for adjusting the prism unit to keep the wavelength in step with that required from the grating instrument.

Alternatively, filters may be used to pass certain desired wavelengths and reject others, but only a limited range of filters is available and a filter with the necessary characteristics may not be obtainable to meet a given requirement.

It is the purpose of the present invention to provide for the isolation or retention of one particular order from a grating and suppression of the others without recourse to a prism unit or filters. The basis of the method is to direct parallel radiation on to the surface of a plane diffraction grating of the reflection type in such a manner that the diffracted radiation of wavelength $\lambda$ at a given angle, is of appreciable intensity, while the diffracted radiations of wavelengths $$\frac{\lambda}{2}, \frac{\lambda}{3}$$

etc. have low intensity and so do not cause serious interference with the wanted radiation of wavelength $\lambda$.

The invention consists in an infra-red monochromator in which one or more diffraction gratings of the reflecting type are used as radiation dispersion means, at least one of said gratings being used simultaneously as wavelength discrimination means for retaining the first order and suppressing the second and higher orders in respect of a selected wavelength interval.

The invention also consists in an infra-red monochromator as set forth n the preceding paragraph wherein parallel radiation is directed on a diffraction grating of the reflecting type said grating having a saw tooth groove form, the arrangement being that the diffracted radiation from said grating lies on the same side of a normal to the surface of an individual groove as the incident radiation and the smaller of the two angles made by the incident and diffracted radiation with said normal has a value in degrees greater than $$\frac{\lambda N}{5000}$$

where $\lambda$ is the first order wavelength to which the grating is set and $N$ is the number of lines per inch on the grating.

The invention also consists in an infra-red monochromator as set forth in the preceding paragraph in which the radiations are diffracted twice or more.

The invention also consists in an infra-red monochromator as set forth in the first of the three preceding paragraphs in which parallel radiation is directed successively on to two or more gratings each grating having a saw tooth groove form, the arrangement being that the diffracted radiation from each said grating lies on the same side of a normal to an individual groove surface as the incident radiation on the grating and that the smaller of the two angles made by the incident and diffracted radiation with said normal has a value in degrees greater than $$\frac{\lambda N}{5000}$$

where $\lambda$ is the first order wavelength to which the grating is set and $N$ is the number of lines per inch on the grating.

The invention also consists in an infra-red monochromator as set forth in any of the four preceding paragraphs arranged in series with an identical monochromator.

The invention also consists in an infra-red monochromator as set forth in any of the five preceding paragraphs used in an infra-red spectrometer.

The invention also consists in an infra-red monochromator as set forth in any of the first five of the six preceding paragraphs used in an infra-red gas analyser.

The invention also consists in an infra-red monochromator substantially as hereinafter described with reference to the accompanying drawings.

One mode of carrying the present invention into effect will now be described, by way of example, with reference to the drawings in which.

Figure 1:
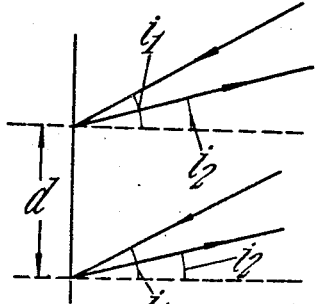
Figure 1 shows a plane ruled grating with radiation impinging thereon.
Figure 2A:
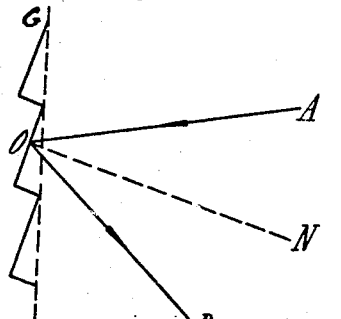
Figure 2a shows a plane echelette grating with the saw-tooth groove form shown.
Figure 2B:
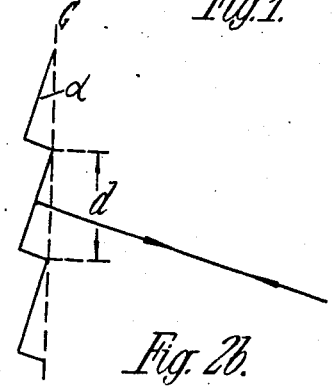
Figure 2b shows the incident radiation striking the groove surface of a grating normally.

In Figure 2a G is a plane echelette grating with the saw-tooth groove form shown. An incident ray AO will tend to be reflected in the direction OB where ON is a normal to the surface $a$ of the groove and angle $AON$ = angle $NOB$. If the wavelength is short in comparison with the grating spacing $d$, then reflection is almost entirely specular and little energy can be diffracted in any other direction. If, however, the wavelength is comparable with $d$ an appreciable proportion of the energy can be diffracted back along OA. In Figure 2b the incident radiation is shown striking the groove surface normally and in this case a strong diffracted ray can be obtained back along the same direction for any wavelength satisfying the grating equation which now becomes:

$$2d \sin \alpha = n\lambda$$

where $\alpha$ is the groove angle.

Figure 3:
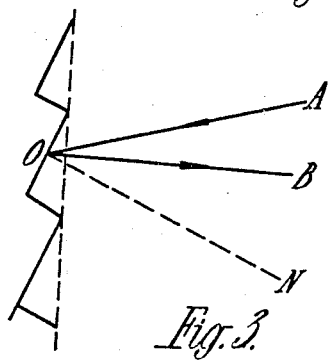
Figure 3 shows the incident and diffracted radiation on the same side of the normal to the grating.

To obtain the required rejection of unwanted orders the arrangement of Figure 3 is employed in which the incident radiation makes an angle (in degrees) greater than $$\frac{\lambda N}{5000}$$

with the normal ON to the groove surface, where $\lambda$ is the first order wavelength and N is the number of lines per inch of the grating. The greater the angle AON the greater the efficiency with which the higher orders $$\frac{\lambda}{2}, \frac{\lambda}{3}$$

etc. are rejected, but of course the wanted radiation itself $\lambda$ will be reduced in intensity if the angle is made unnecessarily large. By way of example, when using a grating with 2400 lines per inch and for a wavelength of $15\mu$, angle AON should exceed 7.2° for the satisfactory attenuation of $7.5\mu$. Other orders will be reduced in intensity at an increasing rate the higher the order.

As described the arrangement is of the Littrow type, but if this condition is not strictly fulfilled the same beneficial separation of orders can still be realised. In Figure 3 AO is the incident ray and OB the diffracted ray or vice versa. The essential features are that both rays must lie on the same side of the normal ON to the groove surface and the smaller of the two angles AON and BON must be greater than $$\frac{\lambda N}{5000}$$

Figure 4:
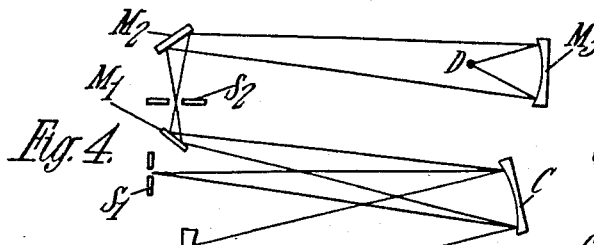
Figure 4 shows a grating monochromator incorporating one form of the invention.

In a preferred form of the invention illustrated in Figure 4, radiation from an infra-red source such as a Nernst filament is focussed on to the entrance slit $S_1$ of a monochromator. The radiation then falls on the collimating mirror C and thence a parallel beam is directed onto the plane echelette grating G. The diffracted radiations falling on mirror C retrace almost the same path but are deflected a little to one side so as to fall on a plane mirror $M_1$ and then are focussed on to an exit slit $S_2$. After passing through this slit rays fall on a plane mirror $M_2$ and thence are directed on to a condensing mirror $M_3$ which concentrates then on to a detector D.

The grating G is mounted in such a way that the conditions previously specific are complied with, the smaller of the two angles made by the incident and diffracted rays with the normal to the groove surface having a value in degrees greater than $$\frac{\lambda N}{5000}$$

$\lambda$ being the first order wavelength to which the monochromator is set. Such an instrument is complete in itself and is available as a grating monochromator without the need for any additional wavelength discrimination means.

Figure 5:
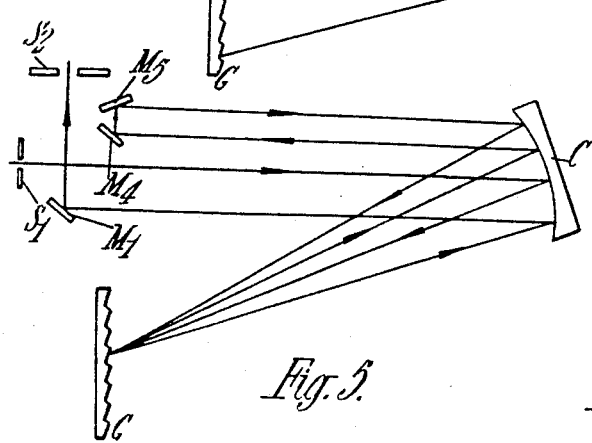
Figure 5 shows modified form of the invention.

In a further form of the instrument a double or multi-pass arrangement may be used, whereby the radiation is diffracted twice or more. The operation of this type of instrument in the double-pass form can be seen by reference to Figure 5 which is similar to Figure 4 except that the radiation after being once diffracted by the echelette grating, instead of passing through the exit slit $S_2$ falls on a pair of plane mirrors $M_4$ and $M_5$ in succession and is returned to the grating G to be diffracted a second time, thereafter being returned to the collimating mirror C and then via the plane mirror $M_1$ to the exit slit $S_2$.

In this way, if the discrimination in favour of $$\lambda \text{ to } \frac{\lambda}{2} \text{ is } n:1$$

after two diffractions the ratio will be $n^2:1$. More than two diffractions may be employed if desired by returning the radiation to the grating for further diffraction before finally allowing the radiation to pass through the exit slit.

In a like manner two or more grating monochromators may be combined in series to achieve a similar result, provided that the gratings are alike and are arranged so that the desired wavelength passes through successive slits, while wavelengths $$\frac{\lambda}{2}, \frac{\lambda}{3}$$

etc. are progressively attenuated relative to $\lambda$. In the case where the gratings are not similar it is still arranged so that successive slits pass the desired wavelength $\lambda$. Suppose, by way of example, that one grating is set to $\lambda$ in the first order, while the second is set to $2\lambda$ in the first order, then for the second grating increasing attenuation will be found in the series $$2\lambda, \lambda, \frac{2\lambda}{3}, \frac{\lambda}{2}$$

etc., while increasing attenuation will be found in the series $$\lambda, \frac{\lambda}{2}, \frac{\lambda}{3}, \frac{\lambda}{4}$$

etc. for the first grating. Only the common wavelengths will be able to reach the exit slit, i.e.

$$\lambda, \frac{\lambda}{2}, \frac{\lambda}{3}$$

etc. Matters can be arranged so that $\lambda$ is only slightly attenuated with respect to $2\lambda$ while $$\frac{\lambda}{2}$$

is greatly attenuated, so that after allowing for the further attenuation by the first grating the overall attenuation is very considerable.

When using two gratings in separate monochromators one slit can be dispensed with, a single slit acting both as exit slit for the first grating and entrance slit for the second grating. In all cases the smaller angle made by either the incident or diffracted ray with the normal to the groove surface must exceed $$\frac{\lambda}{5000}$$

degrees.

Figure 6:
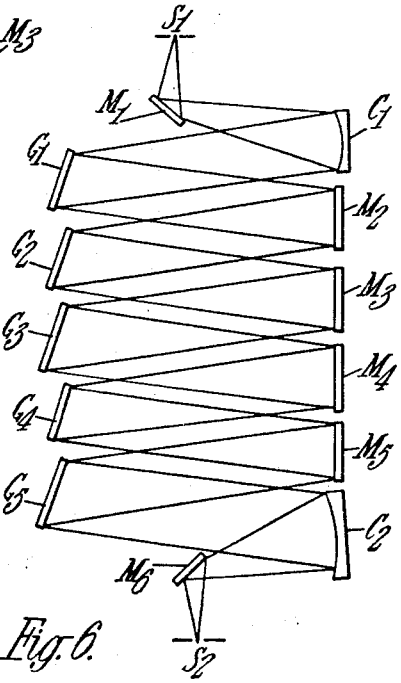
Figure 6 shows a still further modified form of the invention.

In a further use of multiple gratings illustrated in Figure 6, radiation enters the entrance slit $S_1$ and, after reflection from the plane mirror $M_1$, is collimated by the spherical mirror $C_1$, and the resulting parallel beam is directed on to echelette grating $G_1$. The diffracted beam then falls on plane mirror $M_2$ and is returned to grating $G_2$, from which it is diffracted to plane mirror $M_3$. The process is repeated as many times as desired (five times in the example shown) and finally the diffracted beam from $G_5$ falls on the spherical mirror $C_2$, whence it is focussed via plane mirror $M_6$ on to the exit slit $S_2$.

In order to vary the wavelength the five gratings are linked together in such a way that they can be rotated simultaneously about their vertical axes and, it being assumed in the present example that the gratings are identical, the rates of rotation are exactly the same for all five diffracting elements. Over the working range of the instrument a necessary requirement is that the diffracted radiation from any one grating lies on the same side of a line perpendicular to the groove surface as the incident radiation, and the smaller of the two angles has a value in degree greater than $$\frac{\lambda N}{5000}$$

as previously explained.

I claim:

1. An infra-red monochromator in which one or more diffraction gratings of the reflecting type are used as radiation dispersion means, at least one of said gratings being used simultaneously as wavelength discrimination means for retaining the first order and suppressing the second and higher orders in respect of a selected wavelength interval.

2. An infra-red monochromator as claimed in claim 1 wherein parallel radiation is directed on a diffraction grating of the reflecting type said grating having a saw tooth groove form, the arrangement being that the diffracted radiation from said grating lies on the same side of a normal to the surface of an individual groove as the incident radiation and the smaller of the two angles made by the incident and diffracted radiation with said normal has a value in degrees greater than $$\frac{\lambda N}{5000}$$

where $\lambda$ is the first order wavelength to which the grating is set and $N$ is the number of lines per inch on the grating.

3. An infra-red monochromator as claimed in claim 2 in which the radiations are diffracted twice or more.

4. An infra-red monochromator as claimed in claim 1 in which parallel radiation is directed successively on to two or more gratings each grating having a saw tooth groove form the arrangement being that the diffracted radiation from each said grating lies on the same side of a normal to an individual groove surface as the incident radiation on the grating and that the smaller of the two angles made by the incident and diffracted radiation with said normal has a value in degrees greater than $$\frac{\lambda N}{5000}$$

where $\lambda$ is the first order wavelength to which the grating is set and $N$ is the number of lines per inch on the grating.

5. An infra-red monochromator as claimed in claim 1 arranged in series with an identical monochromator.

6. An infra-red monochromator as claimed in claim 1 used in an infra-red spectrometer.

7. An infra-red monochromator as claimed in claim 1 used in an infra-red gas analyser.

References Cited in the file of this patent

UNITED STATES PATENTS

| | | |
|---|---|---|
| 2,729,143 | White | Jan. 3, 1956 |
| 2,744,439 | Hill | May 8, 1956 |
| 2,856,531 | Bouwer | Oct. 14, 1958 |

OTHER REFERENCES

"Bausch and Lomb Certified-Precision Diffraction Gratings"; published by Bausch and Lomb Optical Co., Rochester 2, N.Y., D-261, Jan. 5, 1954, C-H.